(12) United States Patent
Schoor (10) Patent No.: US 11,493,596 B2
(45) Date of Patent: Nov. 8, 2022

(54) ESTIMATION OF CARTESIAN VELOCITIES OF EXTENDED RADAR OBJECTS USING A RADAR SENSOR

(71) Applicant: Robert Bosch GmbH, Stuttgart (DE)

(72) Inventor: Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 16/962,165

(22) PCT Filed: Dec. 14, 2018

(86) PCT No.: PCT/EP2018/084881
§ 371 (c)(1),
(2) Date: Jul. 14, 2020

(87) PCT Pub. No.: WO2019/158250
PCT Pub. Date: Aug. 22, 2019

(65) Prior Publication Data
US 2020/0371198 A1 Nov. 26, 2020

(30) Foreign Application Priority Data
Feb. 15, 2018 (DE) .......................... 102018202294.1

(51) Int. Cl.
*G01S 7/295* (2006.01)
*G01S 7/35* (2006.01)
(Continued)

(52) U.S. Cl.
CPC .............. *G01S 7/295* (2013.01); *G01S 7/354* (2013.01); *G01S 13/343* (2013.01);
(Continued)

(58) Field of Classification Search
CPC ........ G01S 7/295; G01S 7/354; G01S 13/343; G01S 13/4445; G01S 13/4454;
(Continued)

(56) References Cited

U.S. PATENT DOCUMENTS

2009/0157314 A1  6/2009  Jordan et al.
2014/0049419 A1*  2/2014  Lehning ................ G08G 1/015
342/107
(Continued)

FOREIGN PATENT DOCUMENTS

DE  102012024998 A1  6/2014
DE  102013011239 A1  1/2015
(Continued)

OTHER PUBLICATIONS

International Search Report for PCT/EP2018/084881, dated May 31, 2019.

*Primary Examiner* — Erin F Heard
*Assistant Examiner* — Ismaaeel A. Siddiquee
(74) *Attorney, Agent, or Firm* — Norton Rose Fulbright US LLP; Gerard Messina (57) ABSTRACT

A method for a radar sensor, in particular a radar sensor for motor vehicles. The method includes the steps: determining, for particular evaluation channels that correspond to different central antenna positions of relevant transmitting antennas and receiving antennas in one direction, and for particular individual radar targets, a respective individual radial velocity of the particular radar target associated with the particular evaluation channel, based on signals obtained in respective evaluation channels; estimating a particular velocity of the particular radar target based on the determined individual radial velocities of the radar target, the velocity including information concerning a velocity in the forward direction in relation to the radar sensor, and a tangential velocity; and associating radar targets as belonging to an extended radar object as a function of the estimated velocities of the radar targets. A radar sensor is also described.

10 Claims, 4 Drawing Sheets

(51) Int. Cl.
*G01S 13/34* (2006.01)
*G01S 13/44* (2006.01)
*G01S 13/58* (2006.01)
*G01S 13/931* (2020.01)

(52) U.S. Cl.
CPC ...... *G01S 13/4445* (2013.01); *G01S 13/4454* (2013.01); *G01S 13/584* (2013.01); *G01S 13/589* (2013.01); *G01S 13/931* (2013.01); *G01S 7/356* (2021.05); *G01S 2013/93271* (2020.01)

(58) Field of Classification Search
CPC .... G01S 13/584; G01S 13/589; G01S 13/931; G01S 7/356; G01S 2013/93271; G01S 13/878
See application file for complete search history.

(56) References Cited

U.S. PATENT DOCUMENTS

| | | |
|---|---|---|
| 2015/0198711 A1 | 7/2015 | Zeng et al. |
| 2019/0107614 A1* | 4/2019 | Dobrev ................ G01S 13/589 |
| 2021/0096210 A1* | 4/2021 | Maher .................... G01S 7/354 |
| 2021/0111479 A1* | 4/2021 | Spalink ................. G01S 13/89 |

FOREIGN PATENT DOCUMENTS

| | | |
|---|---|---|
| DE | 102013019804 A1 | 5/2015 |
| EP | 2068173 A1 | 6/2009 |
| JP | H1059120 A | 3/1998 |
| JP | H11271433 A | 10/1999 |
| JP | 2008286582 A | 11/2008 |
| JP | 2009041981 A | 2/2009 |
| WO | 2010000252 A2 | 1/2010 |

* cited by examiner

ESTIMATION OF CARTESIAN VELOCITIES OF EXTENDED RADAR OBJECTS USING A RADAR SENSOR

FIELD

The present invention relates to a method for a radar sensor, in particular a radar sensor for motor vehicles, and a radar sensor, in particular for motor vehicles, the radar sensor including an antenna system with multiple antennas that are situated in various positions in one direction.

BACKGROUND INFORMATION

Conventional radar sensors detect radar targets in polar coordinates. For example, a radial distance, a radial relative velocity, and angles in the azimuth and/or in the elevation are measured. Determining a transverse velocity (or tangential velocity) or angular velocity has been possible thus far only via an observed change in the angle over time, or using complex object models for extended radar objects.

Radar sensors are used in motor vehicles, for example, to measure the distances, relative velocities, and azimuth angles of located vehicles or other radar targets in front of the host vehicle. Multiple antennas are then situated, for example, at a distance from one another on the horizontal, so that different azimuth angles of the located radar targets result in differences in the run lengths to be covered by the radar signals from the radar target to the particular antenna. These run length differences result in corresponding differences in the amplitude and phase of the signals that are received by the antennas and evaluated in the associated evaluation channels.

For an angle estimation, use is made of the fact that the amplitude and phase relationships of the signals obtained by the various receiving antennas are characteristically a function of the angle of the radar target. By comparing the (complex) amplitudes received in the various channels to corresponding amplitudes in an antenna diagram, the incidence angle of the radar signal, and thus the azimuth angle of the radar target, may then be determined. Similarly, the elevation angle of a radar target may be estimated using antennas situated vertically on top of one another.

For treating a transversely traveling extended radar object in object tracking, it has been provided, based on a hypothesis of an extended radar object and corresponding association of point targets with the radar object, to treat the point targets jointly and, based on different observed radial velocities $v_1, \ldots, v_n$ and respective measured angles $\alpha_1, \ldots, \alpha_n$ of the n point targets associated with the object, to make an estimation of the actual direction of the velocity $(v_x, v_y)$ of the extended object, based on the overdetermined equation system $$\begin{pmatrix} v_1 \\ v_2 \\ M \\ v_n \end{pmatrix} = \begin{pmatrix} \cos\alpha_1 & \sin\alpha_1 \\ \cos\alpha_2 & \sin\alpha_2 \\ M & M \\ \cos\alpha_n & \sin\alpha_n \end{pmatrix} \begin{pmatrix} v_x \\ v_y \end{pmatrix},$$

which is written as $\underline{v}_M = M\underline{v}$. The solution is ascertained with the aid of the root mean square technique as $\underline{\hat{v}} = (M^T M)^{-1} M^T \underline{v}_M$.

SUMMARY

As the capabilities of radar sensors continue to increase, it is possible to make d, v estimations with increased resolution. In addition, an increase in the usable sensor size, i.e., the size or aperture of the antenna system, allows an increase in the accuracy of the angle estimation and an improved angular separation. For a frequency modulated continuous wave (FMCW) measuring method with linear frequency ramps and an evaluation of the reception signals with the aid of a discrete Fourier transform, in particular a fast Fourier transform (FFT), the width of a distance bin of the Fourier transform corresponds to a distance difference $\Delta r$, where $\Delta r = c/(2F)$, where c is the speed of light and F is the frequency deviation of a linear frequency ramp of the FMCW transmission signal. This distance difference is also referred to here as the distance resolution.

The distance resolution is thus understood to mean the smallest distance difference for which (at the same relative velocity) two measured values of the distance from the radar sensor may still be mapped onto separate bins in the existing operating method of the radar sensor. When an FFT is carried out, the distance resolution corresponds to the distance between two distance bins in the FFT, i.e., the width of one distance bin. In the present and following discussion, the terms "distance resolution" and "width of the distance bin" are used synonymously. In contrast, the distance separability is understood to be twice the width of the distance bin. When the bandwidth of a radar sensor is increased, for a frequency deviation of the transmission signal of F=2 GHz, for example, a distance resolution of $\Delta r = 7.5$ cm is possible. If, at the same time, the aperture or, in the case of a multiple input multiple output (MIMO) radar sensor, the virtual aperture, is increased to values in a similar range, the run length differences between reception signals of individual antennas or evaluation channels, depending on the angle of a radar target, may thus already be great enough that in the Fourier spectra of the evaluation channels, information concerning the amplitude and/or phase of the received signals, depending on the evaluation channel, is contained not only in a frequency bin determined by the d,v estimation of a detected radar target, but also in one or multiple adjacent frequency bins. For a distance of 5 m of a radar target directly in front, and an offset between a center and an outer antenna position of 40 mm, for example, this results in an angular difference of approximately 0.5°. If the radar target has a transverse velocity of 2.7 m/s (10 km/h), for example, no relative velocity is observed at the center antenna position, but at the outer antenna position a radial relative velocity of 0.025 m/s, or on the other side, −0.025 m/s, is observed. For a bin size of the FFT of 0.1 m/s (velocity resolution of the measurement), this corresponds to a frequency position shift of −¼ bin, 0 bin, or +¼ bin in the corresponding three evaluation channels.

An object of the present invention is to provide a method and a radar sensor with which a direct association of point targets with an extended radar object is made possible.

Moreover, an object of the present invention is to provide a method and a radar sensor with which a rapid and simple estimation of a velocity of an extended radar object, in particular a Cartesian velocity, is made possible.

For achieving at least one of the objects, an example method according to the present invention for a radar sensor, in particular a radar sensor for motor vehicles, including an antenna system with multiple antennas that are situated in various positions in one direction, includes the steps: determining, for particular evaluation channels that correspond to different central antenna positions of relevant transmitting antennas and receiving antennas in one direction, and for particular individual radar targets, a respective individual radial velocity of the particular radar target associated with the particular evaluation channel based on signals obtained in respective evaluation channels; estimating for the particular radar targets a particular velocity of the particular radar target based on the determined individual radial velocities of the radar target, the velocity including information concerning a velocity in the forward direction in relation to the radar sensor and a tangential velocity; and associating radar targets as belonging to an extended radar object as a function at least of the estimated velocities of the radar targets. The estimated velocity includes information concerning a velocity in the forward direction relative to the radar sensor, and a tangential velocity, and thus includes a two-dimensional velocity. In particular, the velocity may be a Cartesian velocity, i.e., a velocity that is expressed in an orthogonal coordinate system. For a radar sensor that is oriented directly in the forward direction, the tangential velocity corresponds to the transverse velocity.

This allows (Cartesian) velocities of the particular radar targets to be estimated, based on an individual measurement with an individual transmission signal modulation cycle, in particular, for example, for a transmission signal including a frequency modulation pattern in the form of a frequency ramp or in the form of a rapid chirp sequence. In particular, the (Cartesian) velocities of the radar targets may be estimated from particular frequency spectra, based on an individual measurement of the radial velocity in the particular evaluation channels.

Measuring the velocities and associating the radar targets with an extended radar object may thus take place very quickly. In particular, the measurement of the (Cartesian) velocities may take place directly for the individual radar targets, and based on a detection of the radar target, may take place within an individual modulation cycle or a frequency ramp of the transmission signal. It may thus be possible to measure a Cartesian velocity and carry out an association with an extended object, even for objects which are visible only in one cycle or in a few cycles, and which are therefore difficult to treat using a complex object model, such as quickly laterally moving objects or a roadside structure on a roadway.

This allows a much faster response by a driver assistance system or a system for automated driving, in particular for a radar target at a relatively slight distance. This is particularly advantageous for protecting vulnerable road users (VRUs) such as pedestrians.

A radar target is understood to mean a reflection center with which only one individual position is associated, in contrast to the extended radar object, with which multiple reflection centers are associated. The term "radar target" is used synonymously with "point target."

In the method, a transmission signal of the radar sensor is transmitted by at least one antenna, and a signal is received by at least one antenna. In one advantageous specific embodiment, a transmitted signal is ramp-shaped frequency-modulated. In one advantageous specific embodiment, the radar sensor is an FMCW radar sensor.

The example method may also include the step: estimating a velocity of the extended radar object, based on the determined individual radial velocities of the associated radar targets. Thus, this is a method for estimating a velocity of an extended radar object. This allows a velocity estimation of an extended object that is quicker than and improved over conventional methods. The velocity may include information concerning a velocity in the forward direction relative to the radar sensor, and a tangential velocity. The velocity may in particular be a Cartesian velocity.

In the present and following discussion, the variables that relate as a whole to the radar sensor and that are estimated or determined are also referred to as "global" variables, while variables relating to the particular evaluation channels and the relevant center antenna positions of transmitting antennas and receiving antennas are referred to as "individual" variables. Thus, for example, the tangential velocity to be estimated may be referred to as a global tangential velocity.

Moreover, the object may be achieved by a radar sensor, in particular for motor vehicles, which includes an antenna system with multiple antennas that are situated in various positions in one direction, and including a control and evaluation device that is designed to carry out the example method in accordance with the present invention.

Advantageous example embodiments and refinements of the present invention are described herein.

In one advantageous specific embodiment of the present invention, a Cartesian velocity of the radar target is estimated in the step of estimating a velocity of the particular radar target, based on the relationship:

$$\begin{pmatrix} v_{r,1} \\ M \\ v_{r,i} \\ M \\ v_{r,l} \end{pmatrix} = \begin{pmatrix} \cos\theta_1 & \sin\theta_1 \\ M & M \\ \cos\theta_i & \sin\theta_i \\ M & M \\ \cos\theta_l & \sin\theta_l \end{pmatrix} \begin{pmatrix} v_x \\ v_y \end{pmatrix}, \quad (1)$$

where i=1, . . . , l denotes particular evaluation channels, where $v_{r,i}$ are the determined individual radial velocities of the radar target, $\theta_i$ are individual aspect angles of the radar target associated with the particular evaluation channels, and $(v_x, v_y)$ is the Cartesian velocity of the radar target, where $v_y$ is the tangential velocity and $v_x$ is the velocity of a radar target in the forward direction relative to the radar sensor.

In one advantageous specific embodiment of the present invention, the particular individual radial velocity is determined in the step of determining the particular individual radial velocities of the radar target for the particular evaluation channel, based on a particular frequency position of the signal in the evaluation channel.

In one advantageous specific embodiment of the present invention, a discrete frequency spectrum is computed in the particular evaluation channels with the aid of a Fourier transform, and for the radar target the particular frequency position of the signal in the evaluation channel in question is determined with a resolution that is finer than the frequency spacings of the supporting points of the discrete frequency spectrum. The resolution of the frequency position is understood here to mean a variable that indicates the fineness of gradation of the possible values of the frequency position that may be obtained in the determination. The supporting points of the discrete frequency spectrum may also be referred to as frequency points or frequency bins.

The particular frequency position may be determined, for example, by interpolating the frequency spectrum, searching for a peak maximum of the signal, or by adapting (fitting) a frequency parameter of a model function to the signal in the frequency spectrum.

Exemplary embodiments are explained in greater detail below with reference to the figures.

DETAILED DESCRIPTION OF EXAMPLE EMBODIMENTS

Figure 1:
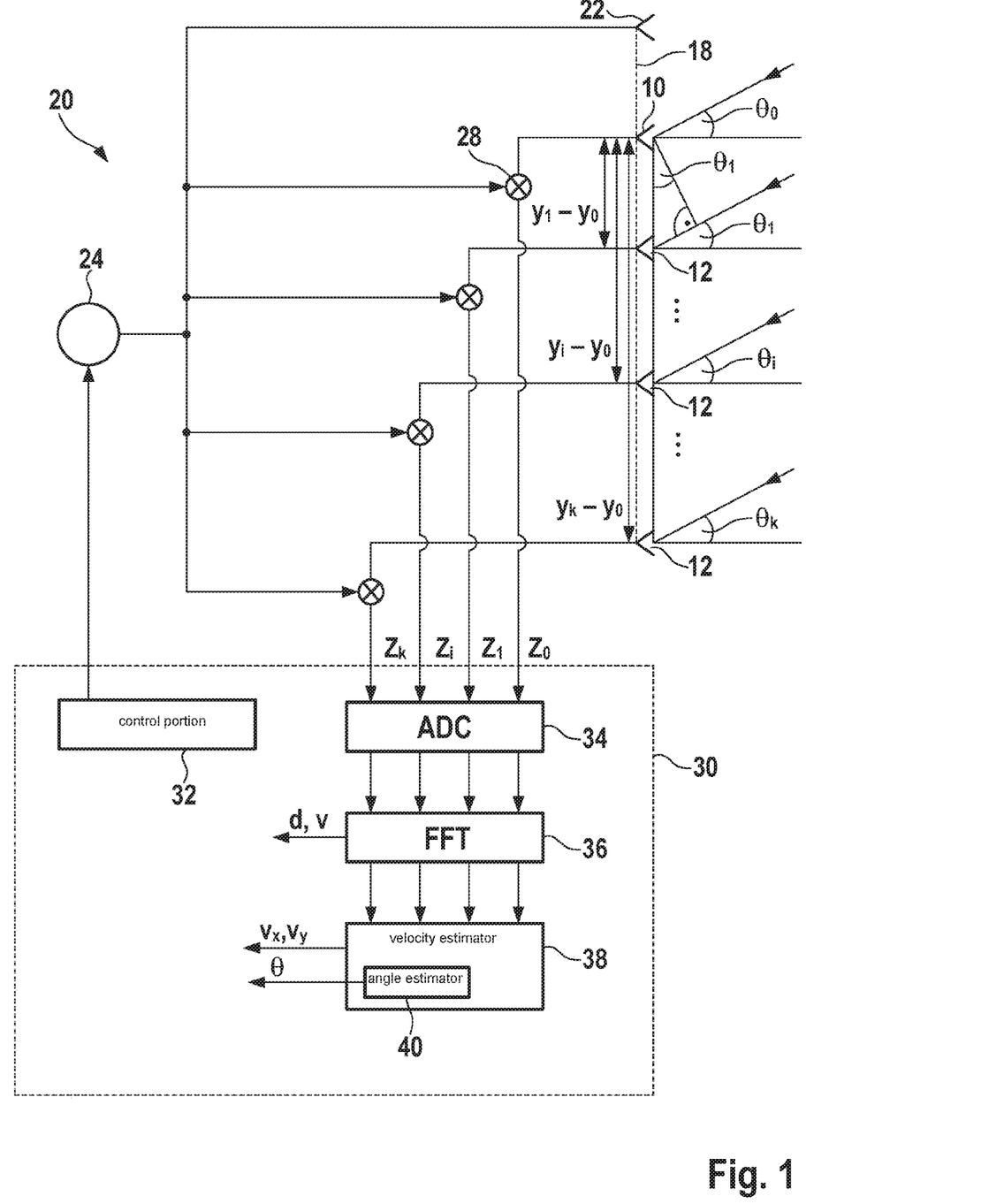
FIG. 1 shows a block diagram of a radar sensor according to the present invention for motor vehicles.

The radar sensor shown in FIG. 1 includes multiple receiving antennas or antenna elements 10, 12 on a shared substrate 18. The radar sensor is installed in a motor vehicle in such a way that multiple antennas 10, 12 are situated next to one another at the same height at horizontal positions yi, where i=0, . . . , k. FIG. 1 symbolically illustrates radar beams that are received by the antennas at a particular azimuth angle θi (aspect angle).

A high-frequency portion 20 for controlling a transmitting antenna 22 includes a local oscillator 24 that generates the radar signal to be transmitted. The radar echoes received by antennas 10, 12 are each supplied to a mixer 28, where they are mixed with the transmission signal delivered by oscillator 24. In this way, for each of antennas 10, 12 a baseband signal or intermediate frequency signal Z0, Z1, . . . , Zi, . . . , Zk is obtained which is supplied to an electronic control and evaluation unit 30.

Control and evaluation unit 30 contains a control portion 32 that controls the functioning of oscillator 24. In the example shown, the radar sensor is an FMCW radar; i.e., the frequency of the transmission signal that is delivered by oscillator 24 is periodically modulated in the form of a sequence of rising and/or falling frequency ramps.

In addition, control and evaluation device 30 contains an evaluation portion that includes an analog/digital converter 34 with k channels, which digitizes intermediate frequency signals Z0 through Zk obtained from k antennas 10, 12 and in each case records over the duration of an individual frequency ramp. The time signals thus obtained are then converted channel by channel into corresponding frequency spectra via a fast Fourier transform (FFT) in a transformation step 36. In these frequency spectra, each radar target is apparent in the form of a peak whose frequency position is a function of the signal propagation time from the radar sensor to the radar target and back to the radar sensor, and of the relative velocity of the radar target due to the Doppler effect.

Based on the frequency positions of two peaks that have been obtained for the same radar target, but on frequency ramps having different slopes, for example a rising ramp and a falling ramp, distance d and relative velocity v of the radar target in question may then be computed in a conventional manner. Estimated distance d may be referred to as the global distance of the radar target, in contrast to individual distances di that are associated with the particular evaluation channels.

As schematically illustrated in FIG. 1, based on the radar beams, as a result of the different positions of antennas 10, 12, the radar beams that have been emitted by the same antenna, reflected at the radar target, and then received by the various antennas, cover different run lengths and therefore have phase differences that are a function of azimuth angle θ of the radar target. In addition, associated intermediate frequency signals Z0 through Zk have corresponding phase differences. Furthermore, the amplitudes (magnitudes) of the received signals are different from antenna to antenna, likewise as a function of azimuth angle θ.

A velocity estimator 38 estimates a Cartesian velocity of a particular radar target having components vx (the velocity in the forward direction in relation to the radar sensor) and vy (the tangential velocity), based on the signals in the frequency spectra of the evaluation channels, as explained in greater detail below. In addition, an angle estimator 40 estimates an azimuth angle of the particular radar target, based on the signals.

Figure 2:
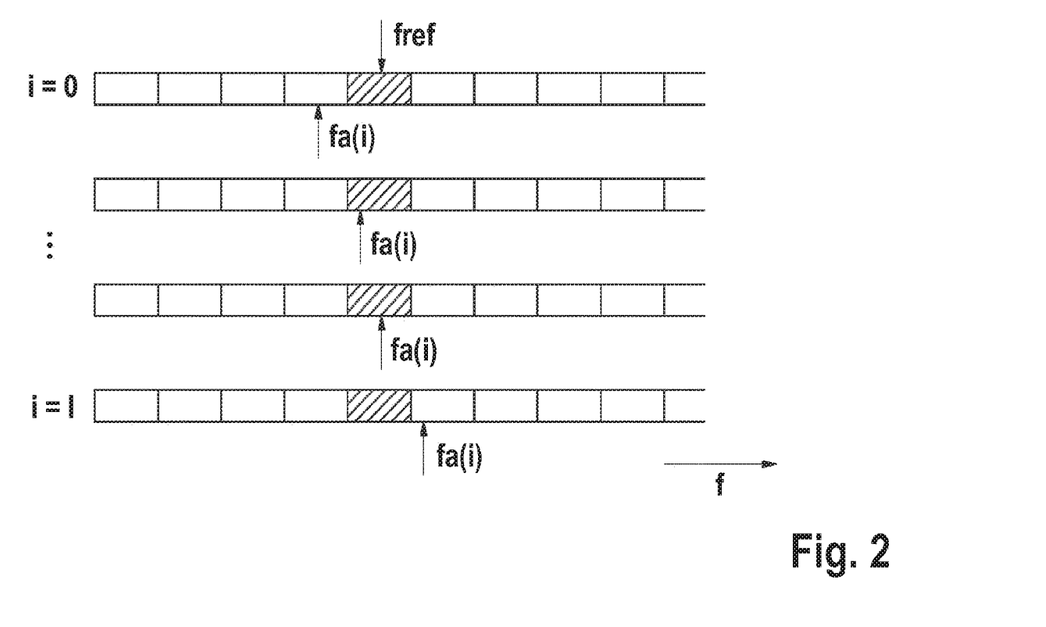
FIG. 2 shows a schematic illustration of frequency bins of Fourier spectra of particular evaluation channels.

At a high bandwidth corresponding to a large frequency deviation of the FMCW modulation, and to a large extension of the antenna system, the complex amplitudes in the individual reception channels are obtained at different frequency positions fa(i) in the frequency spectrum of the received signal, depending on azimuth angle θ of the radar target and depending on its distance d. FIG. 2 schematically illustrates frequency positions fa(i) of the signals (peak of the spectrum) obtained for a radar target in evaluation channels i, successive frequency bins of the Fourier spectrum being illustrated in the direction of increasing frequency f.

Figure 3:
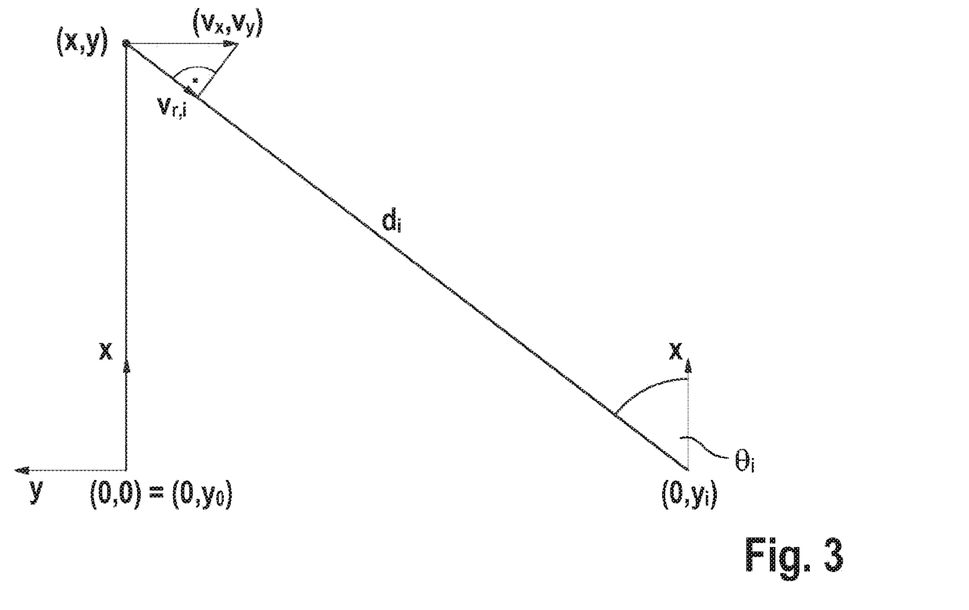
FIG. 3 shows a relationship between an antenna position and a radar target.

FIG. 3 illustrates in a top view the relationship for a point target as a radar target at coordinates (x,y) for an antenna position of an evaluation channel, denoted by index i, at coordinates (0,yi) with Cartesian velocity (vx,vy). The distance of the point target is denoted by reference symbol di, and the aspect angle of the received radar signal is denoted by reference symbol θi. To simplify the illustration, it is assumed that origin (0,0) represents the midpoint of the antenna array and corresponds to a center antenna position. In the example, vx=0, corresponding to a situation in which the point target moves in front of the radar sensor precisely in the transverse direction. For simplification, the figure shows a situation in which the relative radial velocity and absolute radial velocity relative to the origin are equal to zero. A radial velocity vr,0=0 is measured at an antenna position (0,y0) situated at the origin. A radial velocity vr,i is measured at an antenna position (0,yi). This radial velocity corresponds to the projection of Cartesian velocity (vx,vy) toward the radial direction of the antenna position, and is thus a function of aspect angle θi of the radar target at the antenna position.

The relationship between aspect angles θi of evaluation channels i, Cartesian velocity (vx,vy) of the point target, and the individual radial velocities that are estimated from the spectrum in the particular evaluation channels i, is given by equation (1). With an appropriate definition of matrix M, this may be described as:

$$\underline{v}_r = M \underline{v}_{xy}$$

Based on individual radial velocities $v_{r,i}$ in the particular evaluation channels, the vector of Cartesian velocities $v_{xy}$ may then be estimated according to the least squares method:

$$\hat{\underline{v}}_{xy} = (M^T M)^{-1} M^T \underline{v}_r \qquad (2)$$

The greater the angular differences and the more accurately the relative velocities can be determined, the better the estimation in question. The least squares estimation may be numerically computed, for example with the aid of a pseudoinverse, singular value decomposition (SVD), or a QR decomposition.

Distance di of the evaluation channels that is "seen" by the radar sensor due to the run length differences is a function of the antenna configuration. Thus, in a bistatic system or a MIMO system, the effects (distance or propagation time) for the path from the transmitting antenna to the target and from the target to the receiving antenna are added and averaged. Distance di is thus the average distance from the outward path and return path over the average propagation time of the signal. Similarly, a center antenna position from the transmitting antenna and the receiving antenna is considered.

Figure 4:
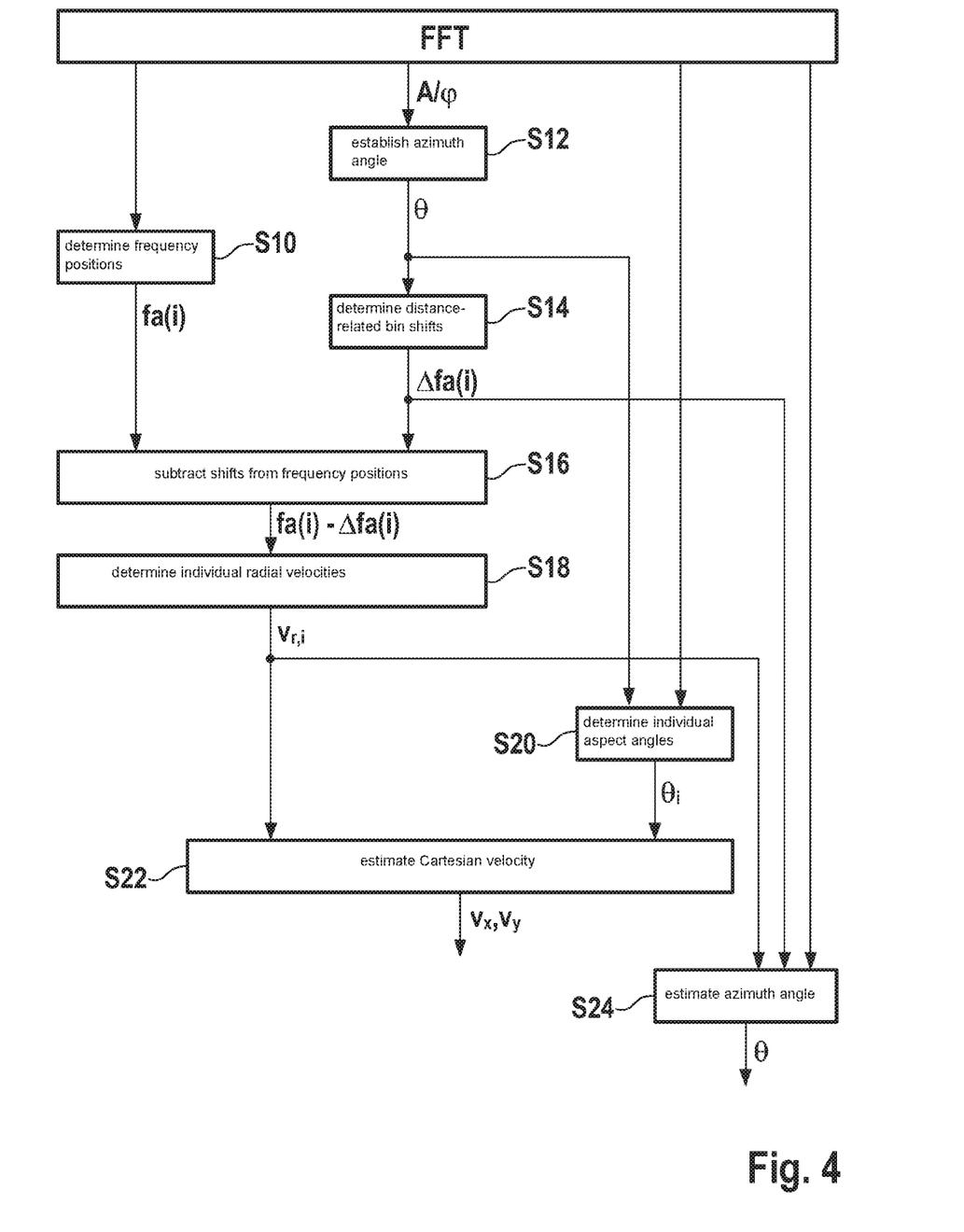
FIG. 4 shows a block diagram for explaining a first part of a method according to the present invention.

Control and evaluation device 30 is designed to carry out a method for estimating the Cartesian velocity of the radar target, which is explained by way of example with reference to FIG. 4 and implemented in velocity estimator 38.

Frequency positions fa(i) of the signals (peak positions) of channels i with high resolution are determined in step S10 by interpolating the frequency spectra.

For each located object, i.e., each radar target (each peak in the frequency spectrum), the complex amplitudes obtained in the I reception channels are compared to the antenna diagram in a first angle estimation in step S12 in order to estimate azimuth angle θ of the radar target. A vector of the complex amplitudes is evaluated at the same frequency position fref in each case in the particular spectra of the channels. Estimated aspect angle θ may be referred to as a "global" aspect angle, in contrast to the individual aspect angles of the particular evaluation channels.

Based on azimuth angle θ and antenna positions yi, distance-related bin shifts (shifts Δfa(i) of the frequency position) of the channels are determined in step S14. The frequency position shifts may be referred to as distance-related frequency position shifts. The frequency position shifts may also be referred to as frequency position corrections. The frequency position shifts, as explained above, result from a high distance resolution of the measurement. The frequency position shift occurs as a function of the aspect angle. The frequency position shift may also be zero, depending on the aspect angle.

Shifts Δfa(i) are subtracted from frequency positions fa(i) in step S16, and remaining frequency positions fa(i)−Δfa(i) are evaluated in step S18 and used to determine individual radial velocities vr,i of channels i. This takes place according to the FMCW equation $$k = \frac{2}{c}(dF + f_0 v_r T),$$

where k is a bin position corresponding to the remaining frequency position, c is the speed of light, d is the distance, F is the frequency deviation of the ramp, f0 is the center frequency, vr is the radial velocity, and T is the duration of the ramp. The evaluated frequency position is the frequency position that remains, taking the frequency position shift into account.

Based on global distance d and estimated azimuth angle θ, individual aspect angles θi are determined in step S20, for example taking into account antenna positions yi, for example based on geometric relationships of these variables. The individual aspect angles may also be computed, for example, from Cartesian coordinates of the radar target and the center antenna positions.

The Cartesian velocity of the radar target is estimated in step S22 based on equations (1) and (2). For an output of the radar sensor, these equations may be transformed, for example, to a radial velocity and a tangential velocity (or angular velocity) relative to the origin.

Angle estimator 40 estimates azimuth angle θ in a second, improved angle estimation in an optional step S24, a vector of the complex amplitudes being evaluated at respective frequency positions in the particular spectra of the channels, taking into account frequency shifts Δfa(i) and/or corresponding velocity-related frequency shifts Δfb(i) resulting from azimuth angle θ and antenna positions yi. In particular, this is a step of the second estimation of the aspect angle of the radar target, which is carried out in addition to above-described (first) step S12 of the estimation of the aspect angle.

The example method may in particular be an iterative method in which steps S14, S16, S18, S20, S22, which are a function of the estimation of the aspect angle, are carried out once again based on the second estimation of the aspect angle.

As is apparent from the diagram, steps may be carried out in parallel to one another or in some other order.

In one advantageous specific embodiment, differences between the individual radial velocities are taken into account when the distance of the radar target is below a distance threshold value. This is because at very large distances, the effects are too slight to be able to distinguish individual radial velocities. The distance threshold value may be selected based on test measurements or based on a theoretical velocity resolution of the radar sensor.

Figure 5:
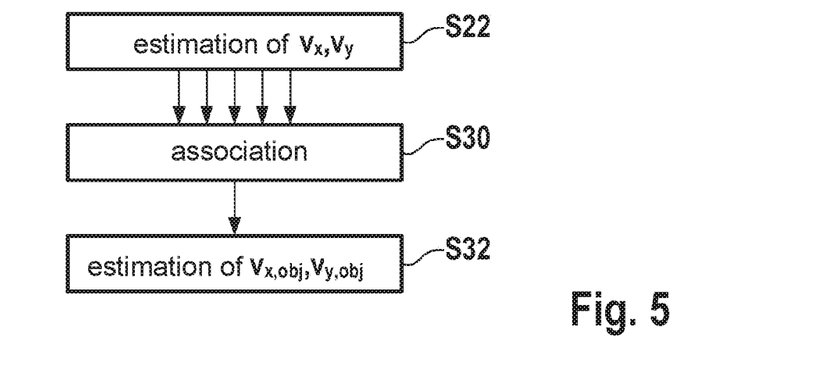
FIG. 5 shows a flow chart for explaining a second part of the method.
Figure 6:
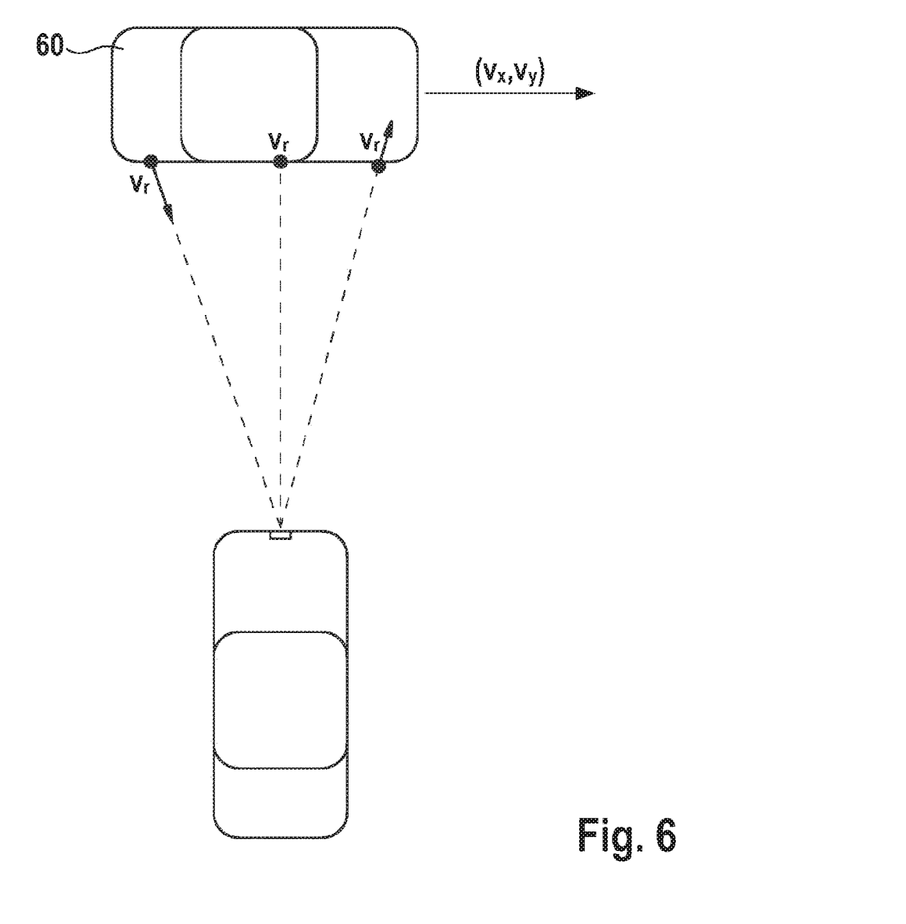
FIG. 6 shows a diagram of a traffic situation.

FIG. 5 illustrates example method steps for estimating a velocity of an extended radar object, based on the above-described method which is carried out for particular located radar targets (point targets). Based on the results from the particular steps S22, multiple radar targets that are part of an extended radar object are associated (associated with one another) in step S30, based on the estimated Cartesian velocities of the radar targets. For example, a decision is made as to whether the Cartesian velocities match within a tolerance range, and whether the positions or distances and angles of the radar targets match within a limiting range. FIG. 6 schematically shows three located radar targets having different radial velocities $v_r$, but for which the same Cartesian velocity $(v_x, v_y)$ has been estimated. These radar targets are associated with an extended object 60.

By expanding equation (1) by lines of the matrix and the left-hand vector for the further radar targets in question that are part of the same extended object, the Cartesian velocity of the extended object may then be correspondingly estimated in step S32 via equation (2).

A bistatic antenna design is used in the exemplary embodiments described here. However, it is also optionally possible to utilize a monostatic antenna design in which the same (group) antennas are used for transmitting and for receiving.

The described method in accordance with the present invention may advantageously be used in particular for FMCW radar sensors that operate with so-called rapid chirp sequences. A plurality of frequency ramps (chirps) having a large slope and only a relatively short duration is run through in rapid succession. The 2D FFT carried out via the individual ramps and via the sequence of the ramps results in a two-dimensional frequency spectrum for each evaluation channel i. Accordingly, frequency positions fa(i) and frequency shifts Δfa(i) and Δfb(i) are then generally two-dimensional vectors.

What is claimed is:

1. A method for a radar sensor for a motor vehicle, the radar sensor including an antenna system with multiple antennas that are situated in various positions in one direction, the method comprising:

determining, for each of particular evaluation channels that correspond to different central antenna positions of relevant ones of transmitting antennas and receiving antennas in one direction, and for each of particular individual radar targets, a respective individual radial velocity of the particular radar target associated with the respective evaluation channel, based on signals obtained in the respective evaluation channels;

estimating, for each of the particular radar targets, a particular velocity of the particular radar target based on the determined individual radial velocities of the radar target, the particular velocity including information concerning a velocity in a forward direction in relation to the radar sensor, and a tangential velocity; and associating radar targets as belonging to an extended radar object as a function of the estimated velocities of the radar targets;

wherein the transmitting antennas and receiving antennas are on a shared substrate, wherein the radar sensor is installable in the motor vehicle so that the multiple antennas are situated next to one another at a same height at horizontal positions yi, where i=0, . . . ,k, so that radar beams are received by the multiple antennas at a particular aspect or azimuth angle θi, wherein as a result of the different horizontal positions of the multiple antennas, radar beams emitted by a same antenna, reflected at a radar target, and then received by the multiple antennas, cover different run lengths and have phase differences that are a function of the azimuth angle of the radar target, wherein associated intermediate frequency signals have corresponding phase differences, and amplitudes of the received signals are different from each of the multiple antennas, as a function of the azimuth angle, wherein a radial velocity $v_r$ of the radar target is estimated based on a velocity matrix $M v_{xy}$, as follows:

$$\underline{v}_r = M \underline{v}_{xy} \quad (1),$$

and wherein based on particular radial velocities $v_{r,i}$ in the particular evaluation channels, a vector of velocities $v_{xy}$ are estimated as follows:

$$\hat{\underline{v}}_{xy} = (M^T M)^{-1} M^T \underline{v}_r \quad (2).$$

2. The method as recited in claim 1, wherein in the estimating for each of the particular radar targets the respective velocity of the particular radar target, a particular Cartesian velocity of the particular radar target is estimated.

3. The method as recited in claim 1, further comprising:
estimating a velocity of the extended radar object based on the determined individual radial velocities of the associated radar targets.

4. The method as recited in claim 1, further comprising:
determining, for each of the particular evaluation channels and each of the particular individual radar targets, a respective individual aspect angle of the particular radar target associated with the particular evaluation channel;
wherein, in the step of estimating the particular velocity of the particular radar target, the velocity of the particular radar target is estimated, based on the determined individual radial velocities of the radar target and the determined individual aspect angles of the radar target.

5. The method as recited in claim 4, wherein in the determining the particular individual aspect angles of the particular radar target, the respective individual aspect angles of the radar target are determined based on an estimated aspect angle of the radar target and an estimated distance of the radar target, taking into account the relevant center antenna position of the particular evaluation channel.

6. The method as recited in claim 1, wherein in the determining the respective individual radial velocities of the particular radar target for the particular evaluation channel, the respective individual radial velocity is determined based on a particular frequency position of the signal in the evaluation channel.

7. The method as recited in claim 1, wherein in the determining the respective individual radial velocities of the particular radar target for the respective evaluation channels, the respective individual radial velocity is determined from a remaining frequency position, taking into account a particular frequency position shift, the particular frequency position shifts for the particular evaluation channels corresponding to differences in distance of the particular radar target from the particular corresponding center antenna positions.

8. The method as recited in claim 7, further comprising:
estimating, for each of the particular radar targets, an aspect angle of the particular radar target based on amplitude and/or phase relationships between signals of respective evaluation channels that correspond to different center antenna positions of the relevant transmitting antennas and receiving antennas in the one direction; and
determining, for each of the particular radar targets, particular frequency position shifts of the signals in the respective evaluation channels, the frequency position shifts corresponding to differences in the distance of the particular radar target from the particular center antenna positions, as a function of the estimated aspect angle;
wherein in the step of determining the respective individual radial velocities of the particular radar target for the respective evaluation channels, each of the particular individual radial velocities is determined from the remaining frequency position of the signal in the evaluation channel, taking into account the particular certain frequency position shift.

9. The method as recited in claim 1, further comprising:
estimating, for each of the particular radar targets, an aspect angle of the particular radar target based on amplitude and/or phase relationships between signals of particular evaluation channels that correspond to different center antenna positions of the relevant transmitting antennas and receiving antennas in the one direction, the signals of the particular evaluation channels being evaluated at particular frequency positions, taking into account particular first frequency position shifts of the signals in the respective evaluation channels, the first frequency position shifts corresponding to differences in the distance of the particular radar target from the particular corresponding center antenna positions, and/or taking into account particular second frequency position shifts of the signals in the respective evaluation channels, the second frequency position shifts corresponding to differences in the individual radial velocities of the respective radar target for the particular evaluation channel.

10. A radar sensor for a motor vehicles, comprising:
an antenna system with multiple antennas that are situated in various positions in one direction; and
a control and evaluation device configured to perform the following:
- determining, for each of particular evaluation channels that correspond to different central antenna positions of relevant ones of transmitting antennas and receiving antennas in one direction, and for each of particular individual radar targets, a respective individual radial velocity of the particular radar target associated with the respective evaluation channel, based on signals obtained in the respective evaluation channels;
- estimating, for each of the particular radar targets, a particular velocity of the particular radar target based on the determined individual radial velocities of the radar target, the particular velocity including information concerning a velocity in a forward direction in relation to the radar sensor, and a tangential velocity; and
- associating radar targets as belonging to an extended radar object as a function of the estimated velocities of the radar targets;

wherein the transmitting antennas and receiving antennas are on a shared substrate, wherein the radar sensor is installable in the motor vehicle so that the multiple antennas are situated next to one another at a same height at horizontal positions yi, where i=0,...,k, so that radar beams are received by the multiple antennas at a particular aspect or azimuth angle θi, wherein as a result of the different horizontal positions of the multiple antennas, radar beams emitted by a same antenna, reflected at a radar target, and then received by the multiple antennas, cover different run lengths and have phase differences that are a function of the azimuth angle of the radar target, wherein associated intermediate frequency signals have corresponding phase differences, and amplitudes of the received signals are different from each of the multiple antennas, as a function of the azimuth angle, wherein a radial velocity $\underline{v}_r$ of the radar target is estimated based on a velocity matrix $M\underline{v}_{xy}$, as follows:

$$\underline{v}_r = M\underline{v}_{xy} \qquad (1),$$

and wherein based on particular radial velocities $v_{r,i}$ in the particular evaluation channels, a vector of velocities $v_{xy}$ are estimated as follows:

$$\hat{\underline{v}}_{xy} = (M^T M)^{-1} M^T \underline{v}_r \qquad (2).$$

* * * * *